United States Patent
Hood et al.

(10) Patent No.: US 9,114,679 B2
(45) Date of Patent: *Aug. 25, 2015

(54) TOW ADAPTER

(71) Applicant: AMANDA BENT-BOLT COMPANY, Logan, OH (US)

(72) Inventors: Michael Hood, Logan, OH (US); Robert Gruschow, Northville, MI (US); Wes Holmes, Mesa, AZ (US)

(73) Assignee: Amanda Bent-Bolt Company, Logan, OH (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/838,646

(22) Filed: Mar. 15, 2013

(65) Prior Publication Data

US 2014/0265249 A1    Sep. 18, 2014

(51) Int. Cl.
*B60D 1/14* (2006.01)
*B60D 1/18* (2006.01)
*B60D 1/56* (2006.01)
*B60D 1/04* (2006.01)

(52) U.S. Cl.
CPC ... *B60D 1/14* (2013.01); *B60D 1/04* (2013.01); *B60D 1/18* (2013.01); *B60D 1/187* (2013.01); *B60D 1/565* (2013.01); *Y10T 29/49959* (2015.01)

(58) Field of Classification Search
CPC ............ B60D 1/04; B60D 1/18; B60D 1/182; B60D 1/185; B60D 1/187; B60D 1/488; B60D 1/52; B60D 1/565
USPC ......... 24/114.5, 115, 128, 129; 248/304, 305, 248/307, 339, 340; 280/480, 480.1, 495; 294/26, 82.1, 902, 904; 403/206, 213
See application file for complete search history.

(56) References Cited

U.S. PATENT DOCUMENTS

| | | | | |
|---|---|---|---|---|
| 735,445 | A * | 8/1903 | Banks | 24/698.1 |
| 1,476,627 | A * | 12/1923 | Emil Luebke et al. | 294/82.1 |
| 1,484,495 | A * | 2/1924 | Hatherley | 294/26 |
| 1,572,347 | A * | 2/1926 | Beck | 24/598.5 |
| 1,889,633 | A * | 11/1932 | Butterworth | 24/116 R |
| 2,165,377 | A * | 7/1939 | Ernest | 24/116 R |
| 2,827,307 | A * | 3/1958 | Osborn | 280/416.3 |
| 3,205,545 | A | 9/1965 | Ring | |
| 3,729,926 | A * | 5/1973 | Buske | 59/93 |
| 4,426,100 | A * | 1/1984 | Yamabe et al. | 280/770 |
| 4,700,917 | A * | 10/1987 | Dillman | 248/227.4 |

(Continued)

OTHER PUBLICATIONS

Tiger Industrial Inc., "Check out the New Billet Aluminum Tiger Claw!" [Online]. Apr. 30, 2009 [retrived on Feb. 7, 2009]. Retrieved from the Internet: <URL:https://web.archive.org/web/20090430234129/http://www.tigerhitch.com/products.htm>.

(Continued)

*Primary Examiner* — Joseph Rocca
*Assistant Examiner* — Marc A Scharich
(74) *Attorney, Agent, or Firm* — Hahn, Loeser & Parks, LLP; Rex W. Miller, II

(57) ABSTRACT

Disclosed is a tow adapter suitable for coupling a device to be towed to a towing vehicle. The tow adapter includes a bracket for attachment to the towing vehicle and a loop and hook for receiving a tether attached to the bracket, the hook attached to the bracket central of the loop. The tether is threaded through the loop and attached to the hook, thereby enabling the towing vehicle to tow the device.

11 Claims, 5 Drawing Sheets

(56) References Cited

U.S. PATENT DOCUMENTS

| | | | |
|---|---|---|---|
| 4,858,977 A * | 8/1989 | Mitchell | 294/82.1 |
| 5,997,063 A * | 12/1999 | McCraw | 294/82.1 |
| 6,536,794 B2 * | 3/2003 | Hancock et al. | 280/511 |
| 6,672,609 B2 * | 1/2004 | Pierman et al. | 280/504 |
| 6,712,379 B2 * | 3/2004 | Graham et al. | 280/480 |
| 7,758,060 B2 * | 7/2010 | Lopez et al. | 280/495 |
| 7,823,942 B1 * | 11/2010 | McCraw et al. | 294/82.1 |
| 7,862,066 B2 * | 1/2011 | Smith | 280/416.1 |
| 7,871,097 B2 * | 1/2011 | Sparkes et al. | 280/480 |
| 8,636,297 B2 * | 1/2014 | Merten et al. | 280/504 |
| 2002/0140206 A1 * | 10/2002 | Lloyd | 280/491.5 |
| 2007/0045985 A1 | 3/2007 | Markley | |
| 2009/0108566 A1 | 4/2009 | Asjad | |
| 2009/0278333 A1 | 11/2009 | Lopez et al. | |

OTHER PUBLICATIONS

International Search Report PCT/US/14/27068 Mailed Jul. 30, 2014.

* cited by examiner

TOW ADAPTER

BACKGROUND AND SUMMARY

Disclosed in this application is a novel method and apparatus for joining a towing vehicle and a device to be towed. More specifically, disclosed is a novel tow adapter for coupling a device to be towed to a towing vehicle.

One common method of coupling a towing vehicle to a device to be towed is by means of a tether, such as a chain, strap, rope or the like. Various tow adapters for coupling towing vehicles to devices to be towed by a tether have been proposed in the prior art. These prior art devices do not allow for securing the tether to the towing adapter securely, requiring the tether to be tied or otherwise secured to the tow adapter. Moreover, these prior art tow adapters are not flexible and receptive to permit towing.

The present disclosure comprises a universal tow adapter suitable for coupling a device to be towed to a towing vehicle. The adapter includes a bracket adapted to be attached to a vehicle to support the tow adapter. The tow adapter has a loop suitable to support a tether to enable the vehicle to tow a device to be towed. The loop has first and second ends attached to the bracket. A hook is also provided and attached to the bracket central of the loop to enable the tether to thread through the loop and attach to the hook.

The present tow adapter is supported by the bracket with the hook facing towards the vehicle. The tether may be a strap or chain. The loop may be made of metal.

Also disclosed is a kit for a tow adapter suitable for coupling a device to be towed to a towing vehicle. The kit includes a bracket adapted to be attached to a vehicle to support a tow adapter and fasteners suitable to fasten the bracket to the vehicle. The tow adapter has a loop suitable to support a tether to enable the vehicle to tow a device to be towed. The loop has first and second ends each attached to the bracket, and a hook attached to the bracket central of the loop to enable the tether to thread through the loop and attach to the hook.

In further arrangements, the hook is adapted to face towards the vehicle when the bracket is attached to the vehicle. Also, the loop may be made of metal.

Also disclosed in this application is a method for securing a device to be towed to a towing vehicle. The method includes the steps of assembling a tow adapter having a bracket; attaching the bracket to a vehicle; and attaching a tether to the device to be towed and securing the tether through a loop to the vehicle and to a hook. The loop has a first end and a second end attached to a bracket, and is suitable to support a tether to enable the vehicle to tow a device to be towed. The hook is attached to the bracket central of the loop.

The tether may be doubled such that the tether reaches from the device to be towed over and through the loop, around the hook, and back through the loop to attach to the device to be towed.

DETAILED DESCRIPTION

Reference will now be made to the attached figures describing embodiments further explaining the described invention, wherein reference numbers correspond to their like in the following description.

Figure 1:
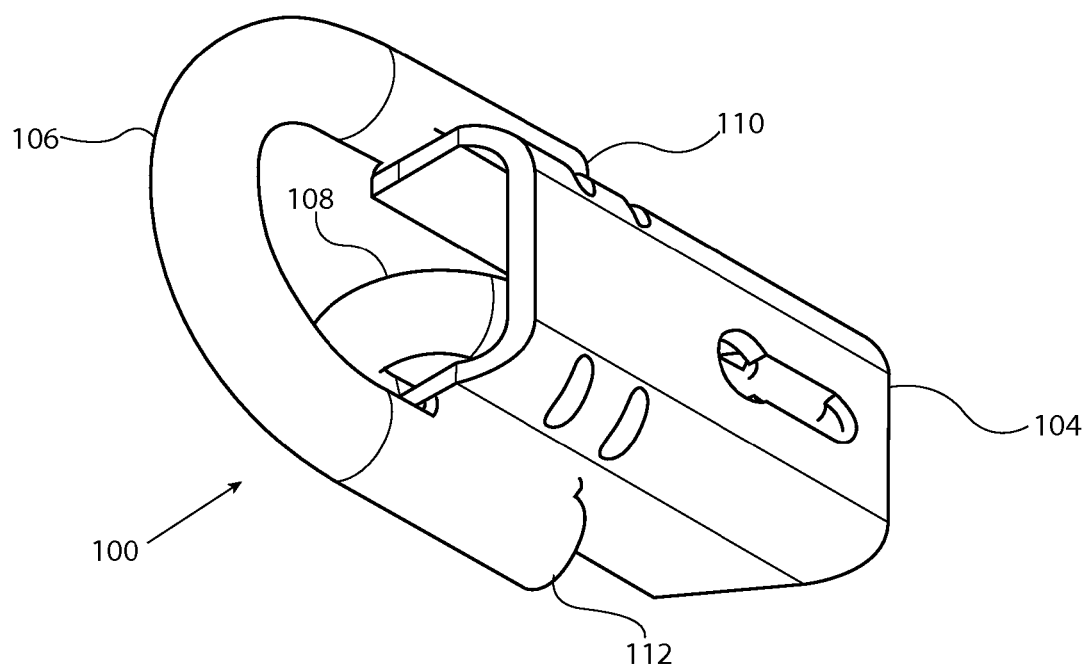
FIG. 1 is a perspective view of the tow adapter.

FIG. 1 illustrates a perspective view of a tow adapter 100 which may be attached to an undercarriage, frame, or other portion of a towing vehicle or article to be towed. The tow adapter 100 includes a bracket 104, loop 106, and hook 108. The loop 106 includes a first end 110 and a second end 112 each secured to the bracket 104. The hook 108 is secured to the bracket 104 and positioned centrally between the ends 110, 112 of the loop 106. As further illustrated in this view, the hook 108 extends upward away from the bracket 104 and is positioned to face away from the loop 106.

The tow adapter 100 may be attached to a vehicle undercarriage or the like. The tow adapter 100 may be attached directly to a towing vehicle 126 or device to be towed 128, such as to the frame, body, undercarriage, or other structural portion. Accordingly, the tow adapter 100 may be attached to the rear of a towing vehicle such as a tractor, truck, car, off-road vehicle, boat, or any other type of vehicle for towing a device to be towed such as a trailer or the like.

Figure 2:
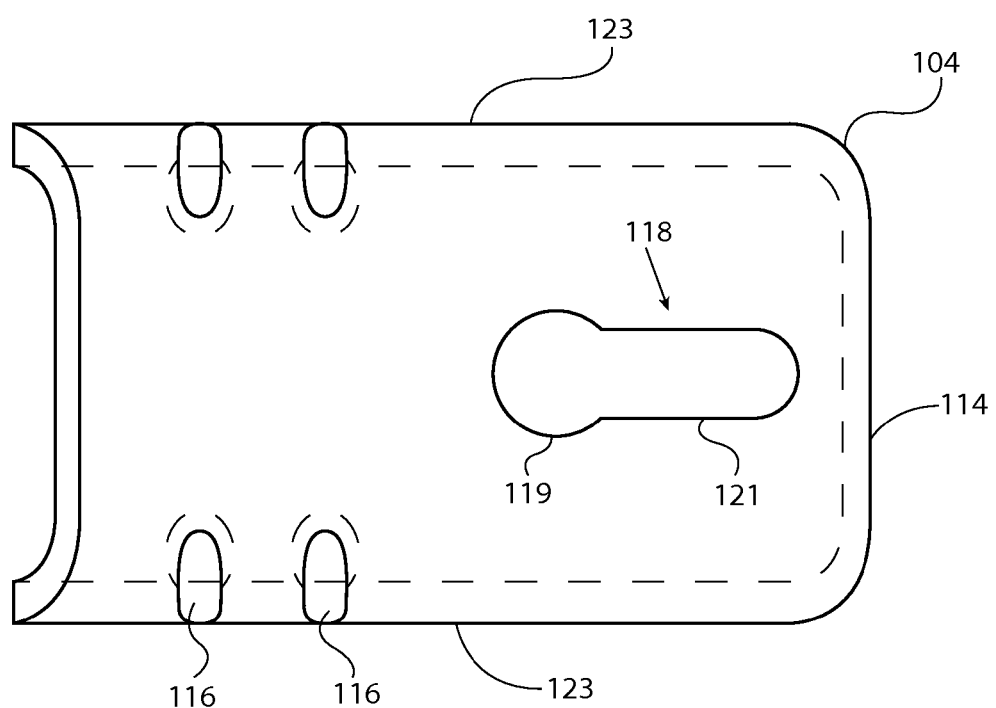
FIG. 2 is a top view of a bracket of the tow adapter.

The tow adapter 100 illustrated in FIG. 1 is connected to the vehicle undercarriage by means of a bracket 104. The bracket is shown in further detail in FIG. 2. As illustrated in FIG. 2, the bracket 104 includes a base portion 114 attachable to a vehicle undercarriage and at least one opening 118 for securing the bracket 104 to the undercarriage. The bracket 104 may also include a number of indentations 116 for reducing stress on the bracket 104 during manufacturing and use.

The base portion 114 of the bracket 104 may include one or more openings 118 for receiving a corresponding number of fasteners 120 (FIG. 5A) for attaching the bracket 104 to the vehicle's undercarriage. Alternatively, the bracket 104 may be welded to the undercarriage or may include integrally formed fasteners for rapid assembly. In the embodiment illustrated in FIG. 2, the opening 118 is a slotted opening having an enlarged circular portion 119 connected to a narrow slotted portion 121 for rapid attachment of the tow adapter to the vehicle. The enlarged circular portion 119 of the opening 118 is sized to receive the head of a fastener, such as a cap screw or a bolt, and the narrow slotted portion 121 is sized to receive the shaft of the fastener. In this arrangement, a bolt for connecting the bracket 104 to the vehicle may be inserted through the enlarged circular portion 119 of the opening 118 and the bracket 104 and slid into place so that the shaft of the fastener is within the narrow slotted portion 121. The fastener may then be tightened, thereby securing the bracket 104 to the vehicle through frictional engagement between the fastener and bracket 104.

The first and second ends 110, 112 of the loop 106 are attachable to the bracket 104. The bracket may include structure for securing the loop 106 to the bracket 104 or the loop 106 may be welded directly to sidewalls 123 of the bracket 104.

Figure 3A:
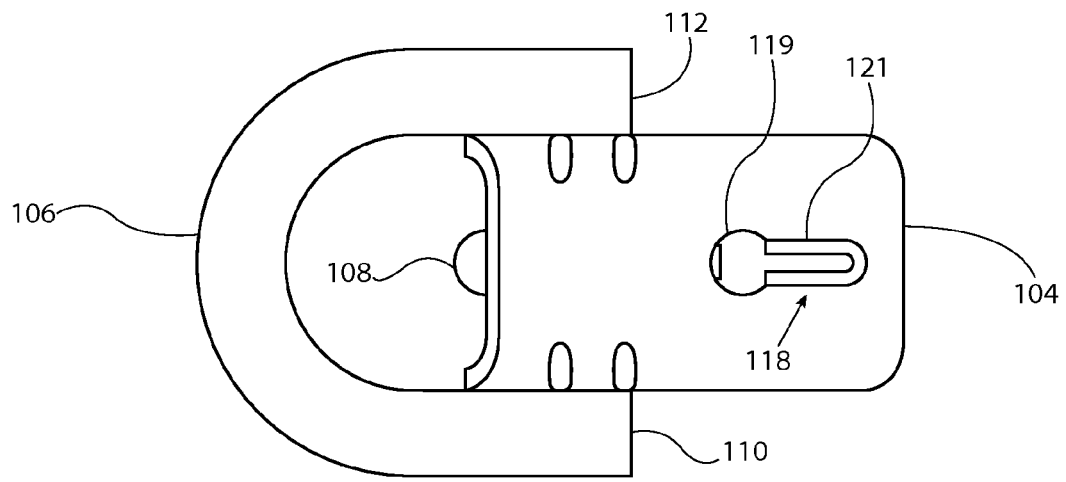
FIG. 3A is a top view of the tow adapter.

FIG. 3A illustrates a top view of the adapter 100 and illustrates the arrangement of the bracket 104, loop 106 and hook 108 relative to one another and the vehicle. As illustrated in this figure, the hook 108 is positioned central of the loop 106 between the first 110 and second 112 ends. The hook 108 may be positioned substantially equal distance between the ends 110, 112. According to some embodiments, the hook 108 may be positioned towards one or the other ends 110, 112.

Figure 3B:
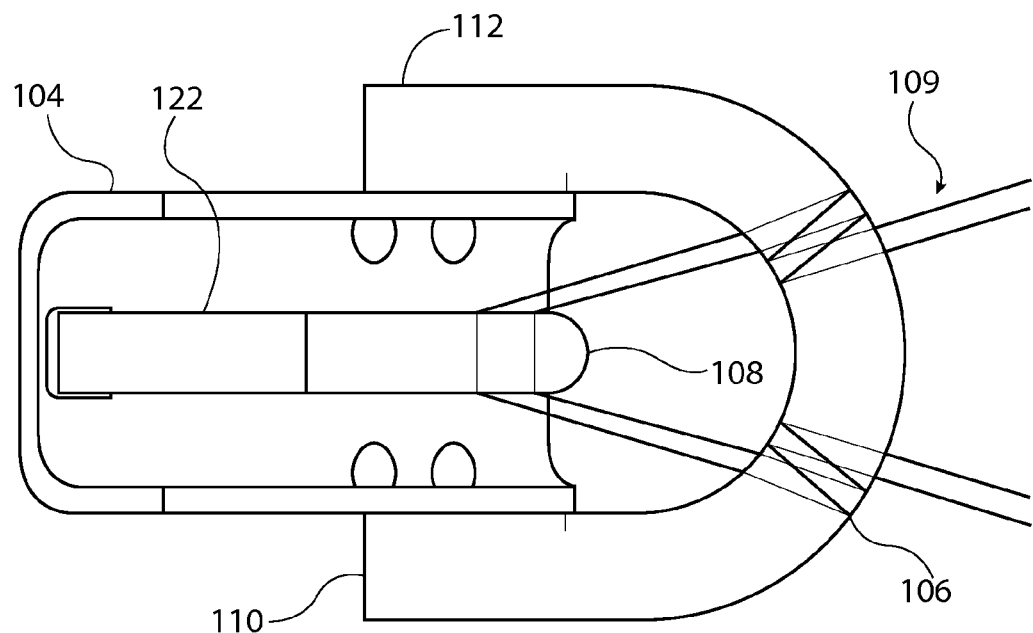
FIG. 3B is a bottom view of the tow adapter.

FIG. 3B is a bottom view of the tow adapter 100. As shown, the hook 108 has a base 122 for connecting the hook 108 to the bracket 104 and a curved portion 124 for receiving and securing a tether 109. The base 122 of the hook 108 according to the illustrated embodiment is welded to the base 104. However, it will also be appreciated that the base 122 may include a number of openings corresponding to openings on the base portion 114 of the bracket 104 and may be secured to the bracket 104 by fasteners. It is further contemplated that the hook 108 may be integrally formed with the bracket or attached using separate fasteners. The curved portion 124 of the hook 108 extends up and away from the base 122 and is curved towards the base 122, towards the towing vehicle and away from the loop 106 to secure a tether 109. The curved portion 124 is preferably integrally formed with the base 122 of the hook 108.

Also shown in FIG. 3B is the loop 106 having first 110 and second 112 ends secured to the bracket 104. In the illustrated embodiment the loop 106 is a continuous length of metal curved about the hook 108 to provide a loop for receiving a tether 109 for coupling a device to be towed to a towing vehicle and facilitate towing thereof.

FIG. 3B also shows the arrangement of the tether 109 relative to the loop 106 and hook 108. According to this embodiment, a loop is formed in the tether 109 and passed over the loop 106. The tether 109 then passes under the loop 106 and back over the loop 106. The tether is then secured to the hook 108 and drawn tight. This arrangement provides adequate coupling between the towing vehicle and article to be towed. The hook 108 secures the tether 109 and prevents disengagement of the tether 109 from the loop 106.

Figure 4A:
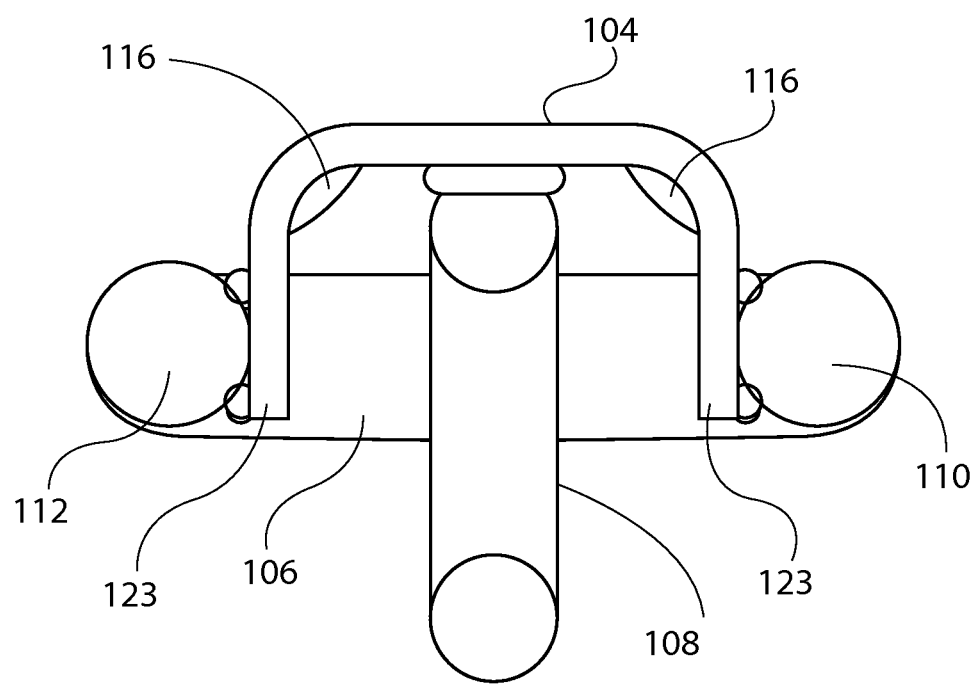
FIG. 4A is a rear view of the tow adapter.

FIG. 4A shows a rear view of the adapter 100 illustrated in FIGS. 3A-B. As shown, the loop 106 is shown with a circular cross-section and the loop 106 is attached tangentially to the sidewalls 123 of the bracket 104 by welds. Alternatively, other suitable means may be used as desired to attach the loop 106 to the sidewalls 123, including fasteners such as screws or structural components such as openings. The ends 110, 112 of the loop 106 may alternatively be threaded to accept threaded nuts.

Figure 4B:
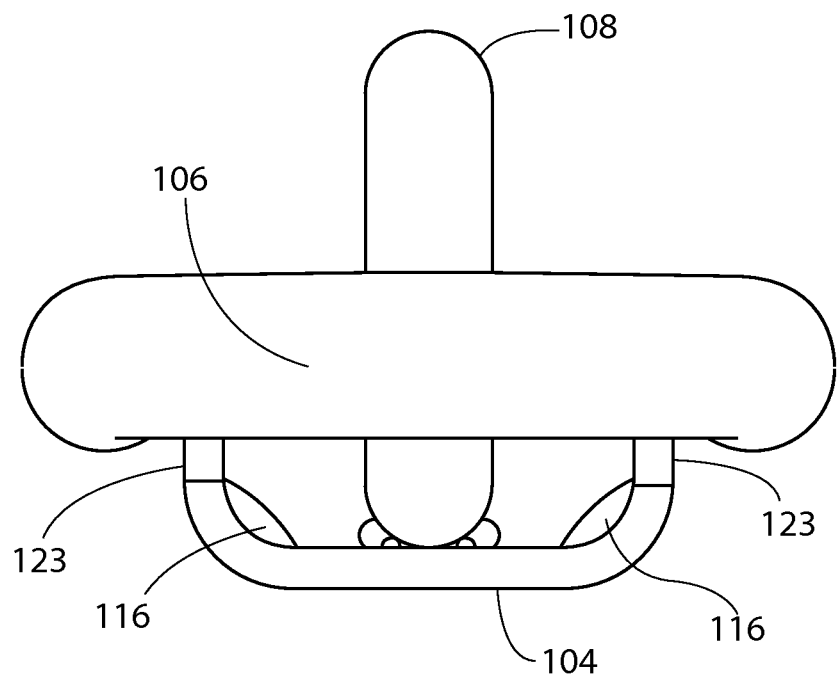
FIG. 4B is a front view of the tow adapter.

FIG. 4B shows a front view of the adapter 100 illustrated in FIGS. 3A-B. According to this view, the loop 106 is secured to the bracket 104 and extends around the hook 108. The indentations 116 of the bracket are visible between the sidewalls 123 of the bracket and the base portion 114 (FIG. 2).

Figure 4C:
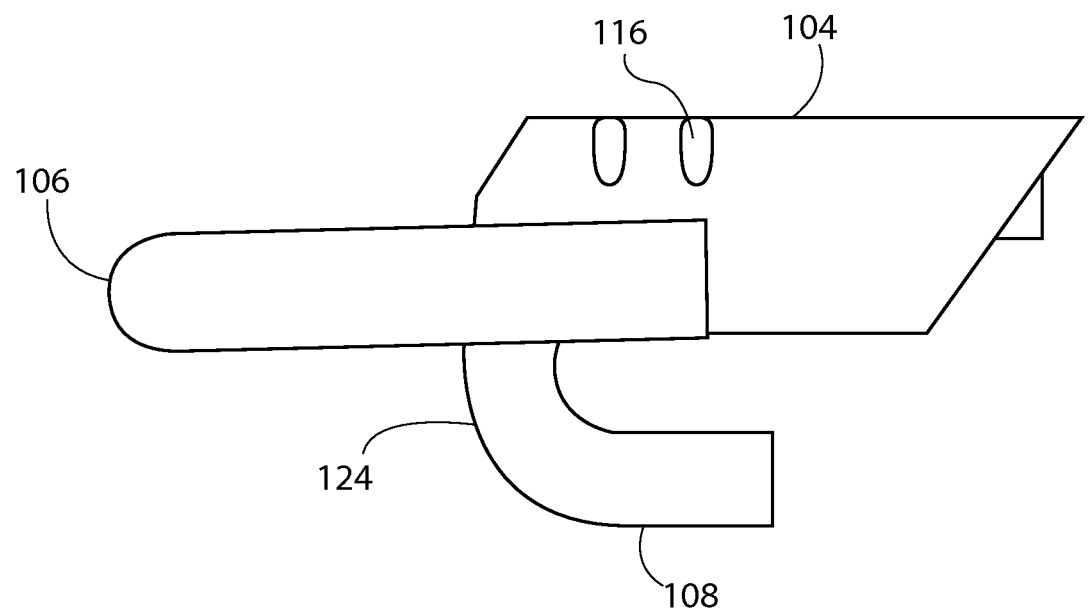
FIG. 4C is a side view of the tow adapter.

FIG. 4C shows a side view of the adapter 100 illustrated in FIGS. 3A-B. This view better illustrates the arrangement of the hook 108 relative to the loop 106 and bracket 104.

Figure 5A:
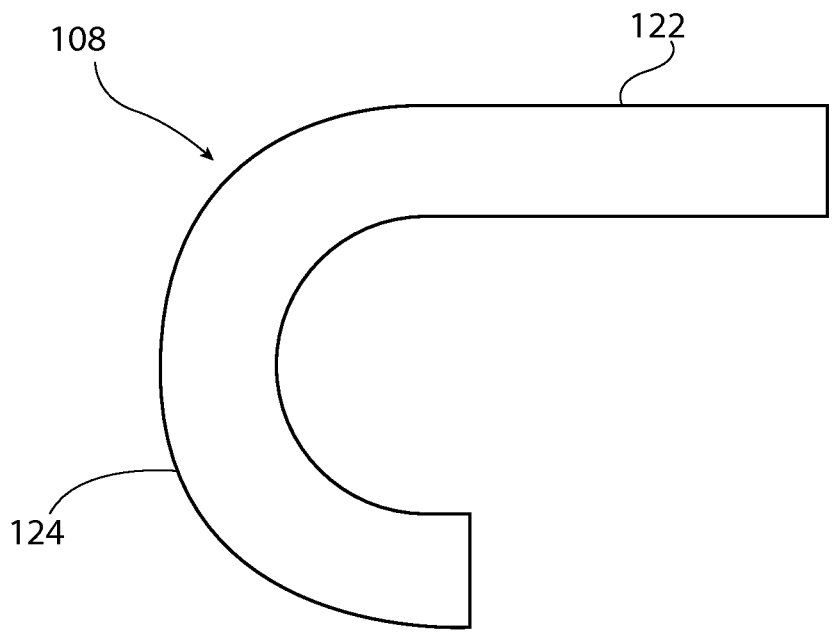
FIG. 5A is a side view of one version of the hook.

FIG. 5A is a side view shows the hook 108, including base 122 and curved portion 124. The curved portion 124 of the hook 108 is substantially curvilinear and continuous. The base 122 of the hook 108 is substantially flat for mounting to the bracket 104 central of the ends of the loop 106. This hook 108 is useful for securing a tether 109 (FIG. 3B) as described above.

Figure 5B:
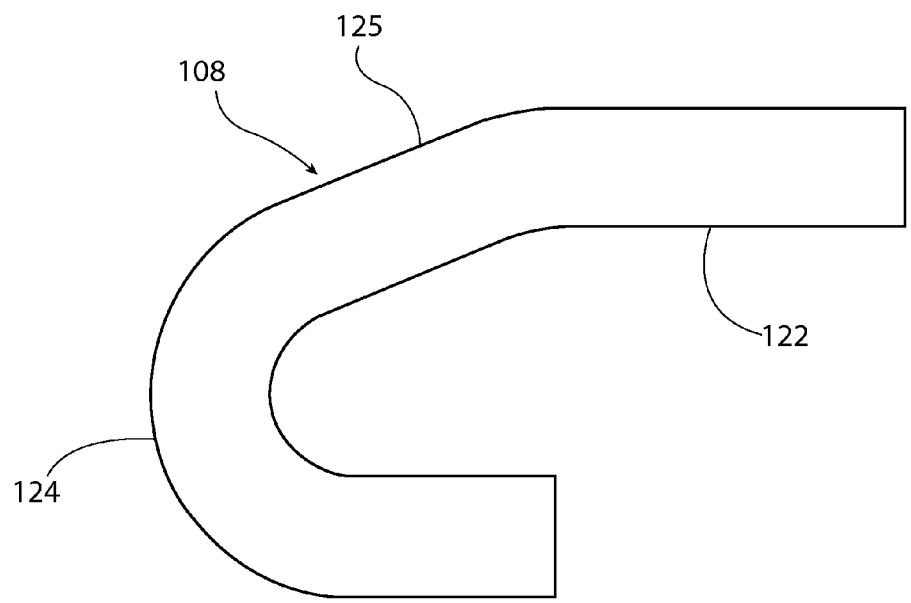
FIG. 5B is a side view of an alternative version of the hook.

FIG. 5B is a side view of an alternative embodiment of the hook 108 including base 122 and curved portion 124. The hook 108 according to this embodiment includes an angled segment 125 between the curved portion 124 and base 122. This angled segment 125 extends away from the base 122 and provides a gap between the hook 108 and bracket 104. As with the embodiment illustrated in FIG. 5A, the curved portion 124 is substantially semi-circular and the base 122 is substantially flat for mounting to the bracket 104.

Various forms of coupling the tether 109 (FIG. 3B) to the tow adapter 100 are contemplated. This embodiment facilitates attachment of a tether 109 to or around the hook 108. The tether 109 may be a strap, chain, rope or other type of flexible length. The tether 109 may be threaded over and through the loop 106 and attached to the hook 108. The tether 109 is thereby secured against pulling out by the loop 106 and the hook 108. In another embodiment, the tether 109 may pass through the loop 106 and wind about the hook 108, thereby securing the towing vehicle to the device to be towed by means of the tow adapter. Alternatively, the tether 109 may pass over and around the loop 106 and be secured to the hook 108, thereby securing the towing vehicle to the article to be towed by means of both the hook and the loop. In yet another embodiment, the tether 109 may secure to the loop 106 and not to the hook 108, securing the towing vehicle to the article to be towed solely by the loop 106.

The tow adapter may connect the towing vehicle to an article to be towed in other way. Rather than tether 109, the loop of tow adapter may directly attached to the vehicle or may directly engage a separate hook on the device to be towed. Alternatively, a corresponding loop on the device to be towed may engage the hook of the tow adapter. These additional way of attaching a device to be towed illustrate flexibility of tow adapter meeting specific needs.

Other towing apparatus, including chains between a trailer and vehicle frame, may be used in addition to provide redundant safety and security between the article to be towed and the towing vehicle.

Also disclosed is a kit for allowing an individual to adapt a towing vehicle or a device to be towed to include a tow adapter 100 suitable for coupling the device to be towed to the towing vehicle by means of a tether 109. The kit includes a bracket 104 adapted to be attached to a vehicle to support the tow adapter 100 and one or more fasteners 120 suitable to fasten the bracket to the vehicle. The tow adapter 100 includes a loop 106 suitable to support a tether 109 to enable the vehicle to tow a device to be towed. The loop includes first 110 and second 112 ends attached to the bracket 104. A hook 108 is attached to the bracket 104 central of the loop to enable the tether 109 to thread through the loop and attach to the hook 108.

Also disclosed is a method for securing a device to be towed to a towing vehicle. The method includes the step of assembling to a towing vehicle a tow adapter 100 having bracket 104, a loop 106 to support a tether 109, and a hook 108 attached central to the loop 106. The loop 106 includes first 110 and second 112 ends connected to the bracket 104. The method also includes the step of attaching a tether 109 to a device to be towed and threading the tether 109 over and through the loop 106 and attaching the tether 109 to the hook 108. Further according to this method, the tether 109 may be doubled such that the tether 109 reaches from the device to be towed over and through the loop 106, around the hook, and back through the loop 106 to attach to the device to be towed.

Figure 6:
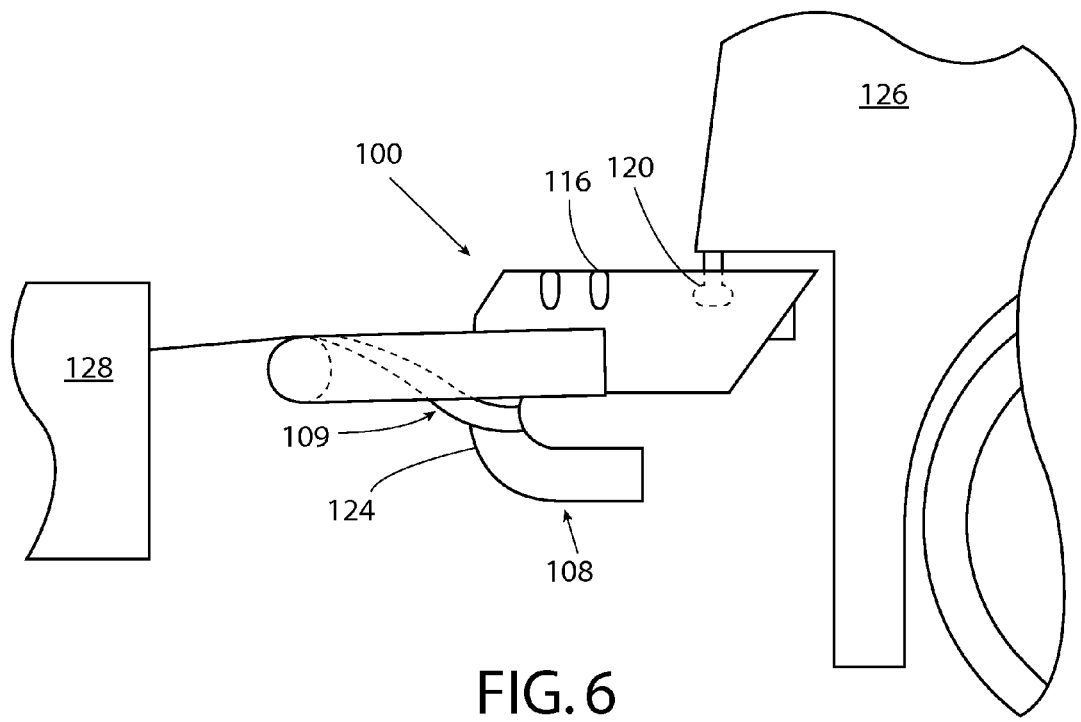
FIG. 6 is a side view of the tow adapter in use with the towing vehicle.

FIG. 6 is a side view of the tow adapter 100 in use with the towing vehicle 126 and device to be towed 128.

What is claimed is:

1. A tow adapter suitable for coupling a device to be towed to a towing vehicle, the tow adapter comprising:
   a bracket adapted to be attached to the towing vehicle to support the tow adapter,
   a loop having a first end and a second end, wherein the first end and the second end are each attached to the bracket, and
   a hook having a base attached to the bracket central of the loop and having a curved portion which extends away from the base of the hook in a first direction, curves downwardly through and below the loop, and then extends in a second direction opposite the first direction, wherein the loop and the hook are configured to receive a tether threaded through the loop and attached to the hook to enable the towing vehicle to tow the device to be towed.

2. The tow adapter as claimed in claim 1, wherein the hook is attached to the bracket such that the hook faces toward the towing vehicle when the tow adapter is attached to the towing vehicle.

3. The tow adapter as claimed in claim 2, further comprising a tether, wherein the tether is a strap.

4. The tow adapter as claimed in claim 2, further comprising a tether, wherein the tether is a chain.

5. The tow adapter as claimed in claim 2, wherein the loop is made of metal.

6. The tow adapter as claimed in claim 1, wherein the hook is oriented transverse to the loop.

7. A kit for a tow adapter suitable for coupling a device to be towed to a towing vehicle, the kit comprising:
   a bracket adapted to be attached to the towing vehicle to support the tow adapter and fasteners configured to fasten the bracket to the towing vehicle,
   a loop having a first end and a second end each attached to the bracket, and
   a hook having a base attached to the bracket central of the loop and having a curved portion which extends away from the base of the hook in a first direction, curves downwardly through and below the loop, and then extends in a second direction opposite the first direction, wherein the loop and hook are configured to receive a tether threaded through the loop and attached to the hook.

8. The kit as claimed in claim 7, wherein the hook is attached to the bracket such that the hook faces toward the towing vehicle when the tow adapter is attached to the towing vehicle.

9. The kit as claimed in claim 7, wherein the loop is made of metal.

10. A kit for a tow adapter suitable for coupling a device to be towed to a towing vehicle, the kit comprising:
    a bracket adapted to be attached to the towing vehicle to support the tow adapter,
    a loop having a first end and a second end, wherein the first end and the second end are each attached to the bracket,
    a hook having a base attached to the bracket central of the loop and having a curved portion which extends away from the base of the hook in a first direction, curves downwardly through and below the loop, and then extends in a second direction opposite the first direction, and
    a tether capable of being threaded through the loop and attached to the hook to enable the towing vehicle to tow the device to be towed.

11. The kit as claimed in claim 10, wherein the hook is attached to the bracket such that the hook faces toward the towing vehicle when the tow adapter is attached to the towing vehicle.

* * * * *